3,142,537
NOVEL COMPOUNDS CONTAINING SULPHUR, FLUORINE, AND OXYGEN

Geoffrey Pass and Hugh Leithead Roberts, Northwich, England, assignors to Imperial Chemical Industries Limited, London, England, a corporation of Great Britain
No Drawing. Filed Apr. 18, 1962, Ser. No. 188,572
Claims priority, application Great Britain May 9, 1961
5 Claims. (Cl. 23—203)

This invention relates to novel compounds containing sulphur, fluorine and oxygen, that are formed in reactions between sulphur tetrafluoride and sulphur pentafluoride hypofluorite under various conditions.

When the reactions are carried out in the absence of oxygen a mixture of compounds is formed among which are the known compounds bis(pentafluorosulphur)oxide, bis(pentafluorosulphur) peroxide, and the novel compound bis-(pentafluorosulphuroxy) sulphur tetrafluoride which has the formula $SF_5.O.SF_4.O.SF_5$.

When the reactions are carried out in the presence of oxygen novel peroxidic compounds having the general formula $$SF_5.(OSF_4)_n.O.O.SF_5$$

where $n$ is 1 or 2, are formed in addition to the above compounds.

These reactions thus provide a process for making bis-(pentafluorosulphur) peroxide and also for making novel compounds of sulphur, fluorine and oxygen of which those that are peroxides may be regarded as the two higher members in the series having the general formula $$SF_5.(OSF_4)_n.O.O.SF_5$$

where $n=0$, 1 or 2. Of these various compounds it is those that are peroxides with which the invention is concerned.

Thus according to one aspect of our invention we provide a process for making peroxides composed of sulphur, fluorine and oxygen and having the general formula $$SF_5.(OSF_4)_n.O.O.SF_5$$

wherein $n$ is 0. 1 or 2, comprising reacting sulphur tetrafluoride with sulphur pentafluoride hypofluorite in the presence of oxygen.

According to another aspect of our invention we provide a process for making bis(pentafluorosulphur) peroxide, $SF_5O.OSF_5$, comprising reacting sulphur tetrafluoride with sulphur pentafluoride hypofluorite in the absence of oxygen.

Yet another aspect of the invention is the provision of the novel compounds hereinbefore described.

It is necessary to exclude moisture from the reaction system since sulphur tetrafluoride and sulphur pentafluoride hypofluorite are readily hydrolysed. The reactions proceed conveniently at slightly elevated temperatures, for example up to about 100° C., and are preferably carried out by heating the reactants in a pressure vessel under the autogenous pressure consequently developed which is usually below 100 atmospheres.

A mixture of liquid and gaseous reaction products is formed, the latter usually including sulphur hexafluoride and thionyl tetrafluoride as well as unchanged sulphur tetrafluoride. The liquid products can be fractionally distilled after separation.

The novel peroxides, as well as bis(pentafluorosulphur) peroxide are useful, either separately or in mixture, as initiators for certain polymerisation reactions, for example the homopolymerisation of tetrafluoroethylene. They can also form telomers with hexafluoropropene and other fully fluorinated olefines and can be used to introduce —$OSF_5$ and —$OSF_5OSF_5$ groups into the benzene ring.

In the examples described below which illustrate the invention the reactions were carried out in autoclaves made of "Hastelloy" C ("Hastelloy" is a registered trademark) having a capacity of 55 or 125 mls. ad fitted with an electromagnetically-operated reciprocating stirrer, and heated by a copper-block electric furnace. The autocalve was charged with reactants that are gaseous at ambient temperatures by evacuating it, cooling the exterior of the autoclave with liquid air and distilling into the autoclave the required amount of reactant from a weighed container. When it was desired to include oxygen in the reaction system this was achieved by adding oxygen first at a pressure of about 80 atmospheres to an intermediate vessel from which it was introduced into the autoclave cooled in liquid air. After the reaction was over the autoclave was cooled to ambient temperature and any gas pressure released through a series of traps cooled in liquid air. After dismantling the liquid products were poured into standard glass containers ready for fractionation. Thereafter the mixture of liquid products is subjected to fractional distillation wherein the individual compounds are separated and recovered as substantially pure compounds.

Example 1

53 g. of sulphur pentafluoride hypofluorite, $SF_5OF$, and 40 g. of sulphur tetrafluoride, i.e., in a 1:1 molar ratio, were added to a 55 ml. "Hastelloy" autoclave and heated at 75° C. for 12 hours. The liquid products amounted to 41 g. and on fractional distillation yielded 15 g. of bis(pentafluorosulphur) oxide, $SF_5OSF_5$, B. Pt. 31° C.; 12 g. of bis(pentafluorosulphur) peroxide, $SF_5.O.O.SF_5$, B. Pt. 49° C.; and 14 g. of bis(pentafluorosulphuroxy) sulphur tetrafluoride, $SF_5.O.SF_4.O.SF_5$, B. Pt. 92° C. The latter had a density of 2.14 at 15° C. and a dielectric constant of 2.3 at 21° C. Power factor measurements at three frequencies gave the following values:

| Frequency..............mc./s.. | 1.5 | 14 | 78 |
|---|---|---|---|
| Power factor......................... | <0.0001 | <0.0001 | 0.003 |

30 g. of sulphur pentafluoride hypofluorite and 70 g. of sulphur tetrafluoride, i.e., in a 1:3 molar ratio, were added to a 125 mls. autoclave and then the autoclave cooled in liquid air and oxygen admitted at a pressure of 80 atmospheres.

The autoclave was then heated at 75° C. for 12 hours. The liquid products amounted to 45 g., and on fractional distillation yielded 7 g. of bis(pentafluorosulphur) oxide; 9 g. of bis(pentafluorosulphur) peroxide; 4 g. of bis(pentafluorosulphuroxy) sulphur tetrafluoride; 19 g. of (pentafluorosulphuroxy)(pentafluoro sulphur peroxy) sulphur tetrafluoride, $SF_5.O.SF_4.O.O.SF_5$, B. Pt. 99° C.; and 6 g. of (pentafluorosulphuroxy) (pentafluorosulphurperoxy pentafluorosulphuroxy) sulphur tetrafluoride, $$SF_5.O.SF_4.O.O.SF_4.O.SF_5$$

B. Pt. 59°/20 mms.

Example 3

A similar experiment to that described in Example 2 but in which 39 g. of sulphur pentafluoride hypofluorite and 76 g. of sulphur tetrafluoride were used and the reaction temperature was 90° C. yielded 6 g. of $SF_5.O.SF_5$; 11 g. $SF_5.O.O.SF_5$; 9 g. $SF_5.O.SF_4.O.SF_5$; 29 g.

$$SF_5.O.SF_4.O.O.SF_5$$

and 7 g. $SF_5.O.SF_4.O.O.SF_4.O.SF_5$.

Examples 4–6

Similar experiments to those described in Examples 2 and 3 were carried out at lower temperatures as shown in the table below. It can be seen that at lower temperatures yields of $SF_5.(OSF_4)_n.O.O.SF_5$ where $n$ is 1 or 2 are greater, and the yield of $SF_5.O.O.SF_5$ smaller, than in the range 75°–90° C.

| $SF_5$ OF, g. | $SF_4$, g. | Reaction temperature, °C. | A g. | B g. | C g. | D g. | E g. |
|---|---|---|---|---|---|---|---|
| 46 | 88 | 0 | --- | --- | --- | 3 | 15 |
| 32 | 70 | 20 | 3 | 0.5 | 1.5 | 30 | 21 |
| 34 | 70 | 50 | 4 | 3 | 7 | 24 | 8 |

A represents $SF_5.O.SF_5$
B represents $SF_5.O.O.SF_5$
C represents $SF_5.O.SF_4.O.SF_5$
D represents $SF_5.O.SF_4.O.O.SF_5$
E represents $SF_5.O.SF_4.O.O.SF_4.O.SF_5$

What we claim is:

1. A process for making peroxides composed of sulphur, fluorine and oxygen and having the general formula $$SF_5.(OSF_4)_n.O.O.SF_5$$

in which $n$ is 0, 1 or 2 comprising reacting sulphur tetrafluoride with sulphur pentafluoride hypofluorite, $SF_5.O.F$, in the presence of oxygen under anhydrous conditions in a sealed vessel at a temperature between ambient temperature and 100° C. and under the autogenous pressure generated thereby, separating the liquid reaction products and subjecting them to fractional distillation and thereafter recovering said individual peroxides as substantially pure compounds.

2. A process for making peroxides composed of sulphur, fluorine and oxygen and having the formula $$SF_5.(OSF_4)_n.O.O.SF_5$$

in which $n$ is an integer selected from th group consisting of 0, 1 and 2, comprising reacting sulphur tetrafluoride with sulphur pentafluoride hypofluorite, $SF_5.O.F$, in the presence of oxygen under anhydrous conditions, in a sealed vessel at a temperature between ambient temperature and 100° C. and under the autogenous pressure generated thereby, cooling the vessel, releasing the pressure, collecting the liquid mixture of products, and subjecting said mixture to fractional distillation to separate the individual peroxides and thereafter recovering said individual peroxides as substantially pure compounds.

3. A process for making the peroxide composed of sulphur, fluorine and oxygen having the formula $$SF_5.O.O.SF_5$$

comprising reacting sulphur tetrafluoride with sulphur pentafluoride hypofluorite in the absence of oxygen under anhydrous conditions in a sealed vessel at temperatures between ambient temperature and 100° C. and under the autogenous pressure generated thereby, separating the liquid reaction products and subjecting them to fractional distillation and thereafter recovering said individual peroxides as substantially pure compounds.

4. The novel peroxide composed of sulphur, fluorine and oxygen and having the formula $$SF_5.(OSF_4).O.O.SF_5$$

and described as (pentafluorosulphuroxy)(pentafluorosulphurperoxy) sulphur tetrafluoride.

5. The novel peroxide composed of sulphur, fluorine and oxygen and having the formula $$SF_5.OSF_4.O.O.SF_4.OSF_5$$

and described as (pentafluorosulphuroxy)(tetrafluorosulphurperoxy)(pentafluorosulphuroxy) sulphur tetrafluoride.

References Cited in the file of this patent
FOREIGN PATENTS
905,003    Great Britain _____ Sept. 5, 1962
OTHER REFERENCES
Merrill et al.: "Bis-(pentafluorosulfur) Peroxide," Journal of The American Chemical Society, volume 83, pages 298–300, January 20, 1961.